United States Patent
Lee et al.

(10) Patent No.: US 10,680,213 B2
(45) Date of Patent: Jun. 9, 2020

(54) COMPACT SECONDARY BATTERY MODULE AND SECONDARY BATTERY PACK USING SAME

(71) Applicant: LG CHEM, LTD., Seoul (KR)

(72) Inventors: Bum-Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 142 days.

(21) Appl. No.: 15/325,173

(22) PCT Filed: Feb. 5, 2016

(86) PCT No.: PCT/KR2016/001335
§ 371 (c)(1),
(2) Date: Jan. 10, 2017

(87) PCT Pub. No.: WO2016/126144
PCT Pub. Date: Aug. 11, 2016

(65) Prior Publication Data
US 2017/0162841 A1    Jun. 8, 2017

(30) Foreign Application Priority Data
Feb. 5, 2015  (KR) .................. 10-2015-0018215

(51) Int. Cl.
*H01M 2/10* (2006.01)
*H02J 7/35* (2006.01)
(Continued)

(52) U.S. Cl.
CPC ....... *H01M 2/1061* (2013.01); *H01M 2/1072* (2013.01); *H01M 10/0525* (2013.01);
(Continued)

(58) Field of Classification Search
CPC ....... H01M 2/10–1094; H01M 10/465; H01M 10/0525; H01M 10/46; H01M 2220/30;
(Continued)

(56) References Cited

U.S. PATENT DOCUMENTS 5,647,650 A * 7/1997 Daugherty ........... A47B 57/565
                                                    312/265.1
6,109,445 A * 8/2000 Beyer ................ H05K 13/0084
                                                    206/561
(Continued)

FOREIGN PATENT DOCUMENTS

EP     2 012 377 A1     1/2009
JP    2006-172882 A     6/2006
(Continued)

OTHER PUBLICATIONS

International Search Report for PCT/KR2016/001335 dated Jun. 3, 2016.

*Primary Examiner* — Richard Isla
*Assistant Examiner* — Dung V Bui
(74) *Attorney, Agent, or Firm* — Birch, Stewart, Kolasch & Birch, LLP

(57) ABSTRACT

The present invention relates to a secondary battery module comprising a cartridge assembly in which at least two or more cartridges are stacked and combined, wherein the module comprises one or more fixed members provided on the outer surface thereof in order to configure a battery pack in which one or more modules are mechanically/electrically connected in series or in parallel with each other.

18 Claims, 13 Drawing Sheets

(51) Int. Cl.
*H02S 40/38* (2014.01)
*H01M 10/0525* (2010.01)
*H01M 10/46* (2006.01)

(52) U.S. Cl.
CPC .............. *H01M 10/465* (2013.01); *H02J 7/35* (2013.01); *H02S 40/38* (2014.12); *H01M 2220/10* (2013.01); *H01M 2220/30* (2013.01); *Y02E 60/122* (2013.01)

(58) Field of Classification Search
CPC ........ H01M 2220/10; H02J 7/355; H02J 7/35; H02S 40/38; Y02E 60/122
USPC .......................................................... 320/101
See application file for complete search history.

(56) References Cited

U.S. PATENT DOCUMENTS

| | | | |
|---|---|---|---|
| 8,420,243 B2 | 4/2013 | Satake et al. | |
| 8,669,000 B2* | 3/2014 | Yoon | H01M 10/0481 429/156 |
| 9,653,748 B2 | 5/2017 | Kruger et al. | |
| 2006/0286450 A1* | 12/2006 | Yoon | H01M 2/021 429/180 |
| 2007/0062744 A1* | 3/2007 | Weidenheimer | F41B 6/00 307/71 |
| 2007/0082744 A1* | 4/2007 | Corey | F16D 3/78 464/99 |
| 2008/0124622 A1* | 5/2008 | Hamada | H01M 2/1077 429/149 |
| 2009/0015994 A1* | 1/2009 | Liu | H05K 5/026 361/679.58 |
| 2012/0121937 A1* | 5/2012 | Kwak | H01M 2/34 429/7 |
| 2012/0231318 A1* | 9/2012 | Buck | H01M 2/0245 429/120 |
| 2013/0122339 A1 | 5/2013 | Chae et al. | |
| 2013/0183562 A1* | 7/2013 | Workman | H01M 2/1022 429/100 |
| 2013/0273398 A1 | 10/2013 | Hoshi et al. | |
| 2013/0288094 A1 | 10/2013 | Noh et al. | |
| 2014/0050954 A1* | 2/2014 | Kim | H01M 2/30 429/90 |
| 2014/0356662 A1 | 12/2014 | Yang et al. | |
| 2015/0000740 A1* | 1/2015 | Mizuo | H01L 31/0488 136/259 |

FOREIGN PATENT DOCUMENTS

| | | | |
|---|---|---|---|
| JP | 2008-537299 A | 9/2008 | |
| JP | 2011-113706 A | 6/2011 | |
| JP | 2013-235827 A | 11/2013 | |
| KR | 20-1998-056716 A | 10/1998 | |
| KR | 10-2012-0016354 A | 2/2012 | |
| KR | 10-2012-0039796 A | 4/2012 | |
| KR | 10-2012-0074421 A | 7/2012 | |
| KR | 10-2012-0081821 A | 7/2012 | |
| KR | 10-2013-0122323 A | 11/2013 | |
| KR | 10-2014-0041337 A | 4/2014 | |
| KR | 101393436 B1 * | 5/2014 | .......... C07D 401/12 |
| KR | 10-2014-0140678 A | 12/2014 | |

* cited by examiner

COMPACT SECONDARY BATTERY MODULE AND SECONDARY BATTERY PACK USING SAME

TECHNICAL FIELD

The present application claims priority to Korean Patent Application No. 10-2015-0018215 filed on Feb. 5, 2015 in the Republic of Korea, the disclosure of which is incorporated herein by reference.

The present disclosure relates to a secondary battery module and a secondary battery pack using the same, and more specifically, to a compact lithium secondary battery module and a secondary battery pack in which a plurality of modules are connected in series/parallel mechanically/electrically.

BACKGROUND ART

With the increased technological development and demands for a mobile device, demands for a secondary battery as energy source has rapidly increased. A nickel-cadmium battery or a hydrogen ion battery, which was used as a secondary battery in the past, has recently been increasingly replaced by a lithium ion battery and a polymer lithium ion battery having high energy density.

A lithium secondary battery using lithium complex oxide, and so on, which has high power and capacity relative to weight is receiving increasing attention for its use as a positive electrode active material of the secondary battery. Generally, the lithium secondary battery has a structure in which an electrode assembly of a positive electrode/separator/negative electrode structure and an electrolyte is embedded in a sealed container.

Meanwhile, the lithium secondary battery is composed of a positive electrode, a negative electrode, a separator interposed therebetween, and the electrolyte. Further, the lithium secondary battery may be categorized into the lithium ion battery (LIB), the polymer lithium ion battery (PLIB), and so on, according to materials used for a positive electrode active material and a negative electrode active material. In a related art, the electrode of the lithium secondary battery may be formed by coating the positive electrode active material or negative electrode active material on a current collector such as aluminum or copper sheet, mesh, film, foil, and so on, and drying the same.

Generally, it is a hard task to configure the secondary battery module to be compact. However, even when the module is configured to be compact, since a separate mounting structure should be applied so as to assemble into a pack, even with the modules of high energy density, forming the separate modules into a pack involves a problem of reduced energy density of the whole pack.

DISCLOSURE

Technical Problem

The present disclosure is designed to solve the problems of the related art, and therefore, the present disclosure is directed to providing a compact secondary battery module and a secondary battery pack, in which the module itself can be configured to be compact, and which also have an assembly structure that can be used as a substitute for a mounting structure when such compact modules are configured into a pack, thus making use of separate mounting space unnecessary.

Technical Solution

In one aspect of the present disclosure, there is provided a secondary battery module including a cartridge assembly in which at least two or more cartridges for receiving secondary battery cells are stacked and combined, and one or more fixation members provided on an outer surface of the module to configure a battery pack in which one or more modules are mechanically/electrically connected in series or in parallel.

Preferably, the fixation members includes bosses or hooks protruding outwardly from any of an upper cover and a lower cover respectively coupled with both sides of the cartridge assembly.

Preferably, the bosses have a column structure having a circle, oval, polygon, or rhombus shape in cross section.

Preferably, the hooks have a circle, oval, polygon or rhombus shape in cross section, and comprise a plurality of discontinuous elastic pieces.

Preferably, the fixation members include insertion grooves recessed in a surface of any of the upper cover and the lower cover which are respectively coupled with both sides of the cartridge assembly.

Preferably, the insertion grooves are formed in a circle, oval, polygon or rhombus shape having a predetermined depth.

In another aspect of the present disclosure, there is also provided a secondary battery pack including the compact secondary battery module described above, and such secondary battery pack includes a home photovoltaic solar panel energy storage system.

In another aspect of the present disclosure, there is also provided a secondary battery pack in which one or more secondary battery modules are connected in series or in parallel mechanically/electrically, and which includes a pack case having a receiving space, at least one or more secondary battery modules each including a cartridge assembly in which at least two or more cartridges for receiving secondary battery cells are stacked and combined, and at least one or more fixation members provided on an outer surface, in which the secondary battery modules can be received in the receiving space, and a pack cover having a fixing part coupled with the fixation members to fix the modules in position, wherein the pack cover is provided to cover the pack case.

In another aspect of the present disclosure, there is also provided a secondary battery pack in which one or more secondary battery modules are connected in series or in parallel mechanically/electrically, which includes a pack case having a receiving space, at least one or more secondary battery modules each including a cartridge assembly in which at least two or more cartridges for receiving secondary battery cells are stacked and combined, at least one or more fixation members provided on an outer surface, wherein the secondary battery modules can be received in the receiving space, and at least one or more brackets having a fixing part coupled with the fixation members to fix the modules in position, wherein the brackets are disposed in the receiving space, and a pack cover provided to cover the pack case.

Preferably, the fixation members include bosses or hooks protruding outwardly from any of an upper cover and a lower cover respectively coupled with both sides of the cartridge assembly.

Preferably, the bosses have a column structure having a circle, oval, polygon or rhombus shape in cross section.

Preferably, the hooks have a circle, oval, polygon or rhombus shape in cross section, and comprise a plurality of discontinuous elastic pieces.

Preferably, the fixation members include insertion grooves recessed in a surface of any of the upper cover and the lower cover which are respectively coupled with both sides of the cartridge assembly.

Preferably, the insertion grooves are formed in a circle, oval, polygon, or rhombus shape having a predetermined depth.

Preferably, the secondary battery pack includes a home photovoltaic solar panel energy storage system.

Advantageous Effects

The present disclosure gives the following effects. A compact secondary battery module according to some exemplary embodiments has a stack of a plurality of cells in which a temperature sensor is disposed in contact with a center in a stack direction of the entire cells, or more particularly, in contact with a side surface of the cells on which leads are formed, whereby the size of the module is prevented from increasing when the stack-type module is configured.

DESCRIPTION OF DRAWINGS

The accompanying drawings illustrate preferred embodiments of the present disclosure and together with the foregoing disclosure, serve to provide further understanding of the technical spirit of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The term 'BMS' used in the present disclosure indicates a battery management system.

Figure 1:
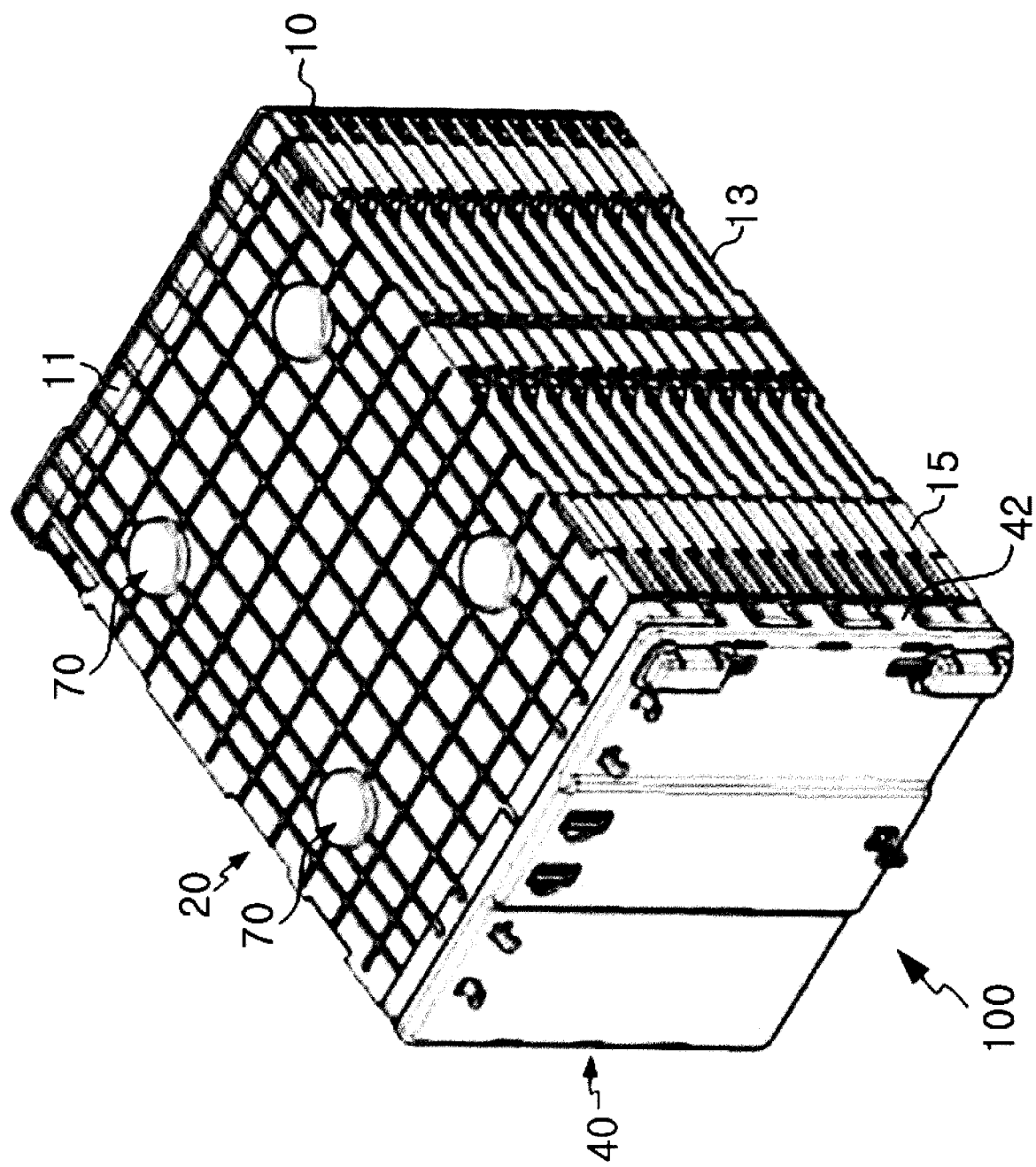
FIG. 1 is a front perspective view illustrating a secondary battery module in an assembled state according to an exemplary embodiment.
Figure 2:
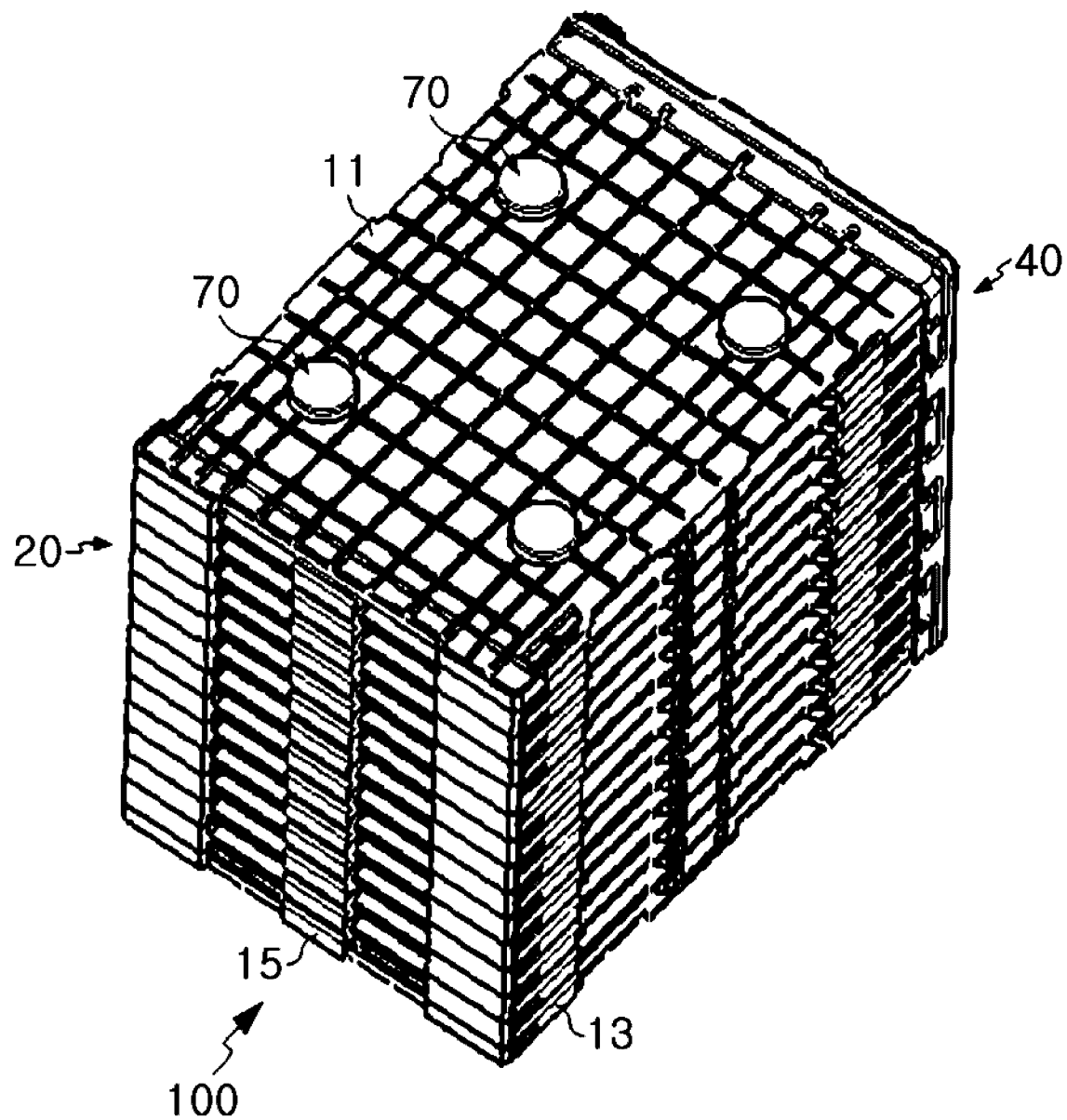
FIG. 2 is a rear perspective view of FIG. 1.
Figure 3:
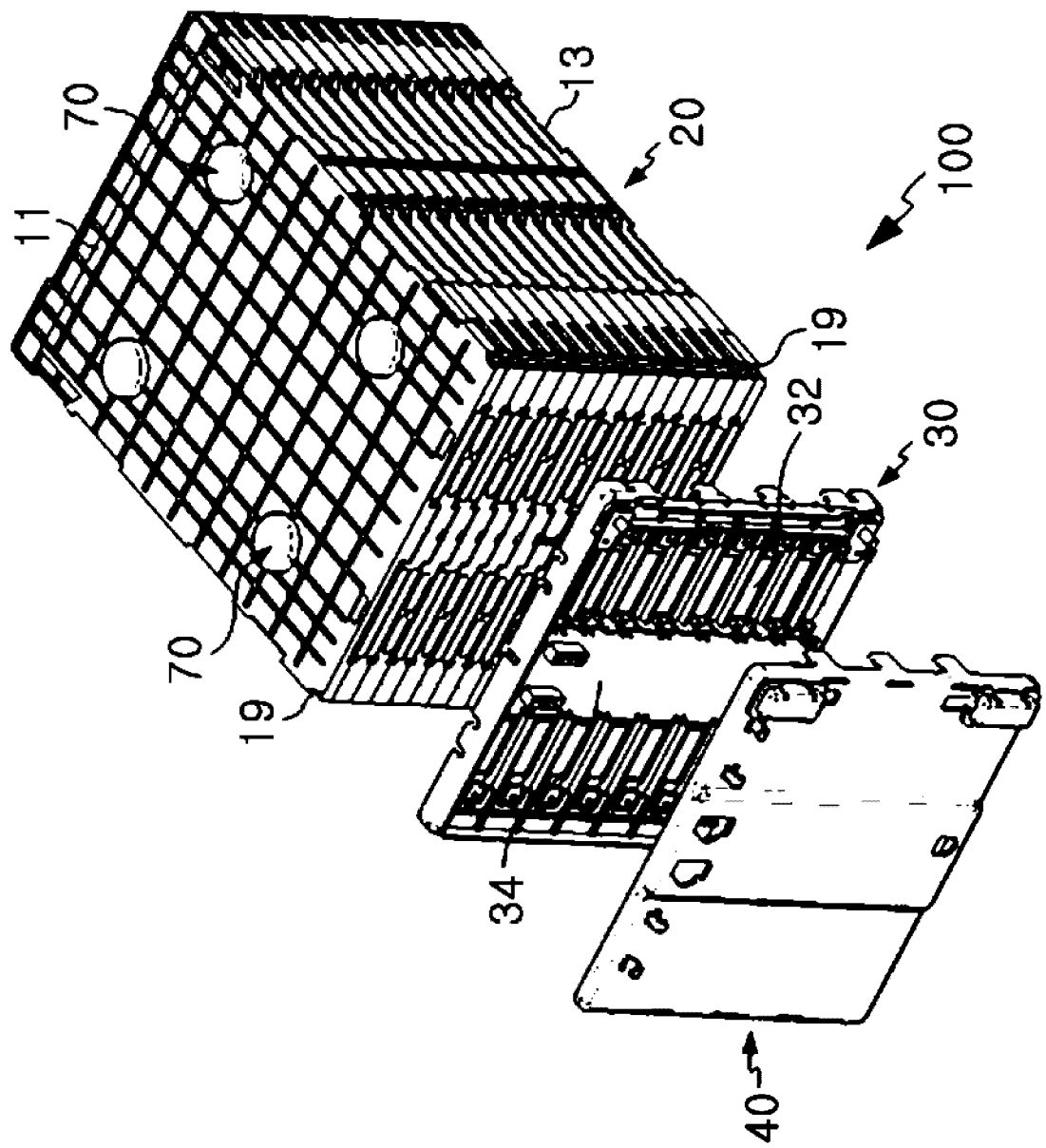
FIG. 3 is an exploded perspective view of FIG. 1.
Figure 4:
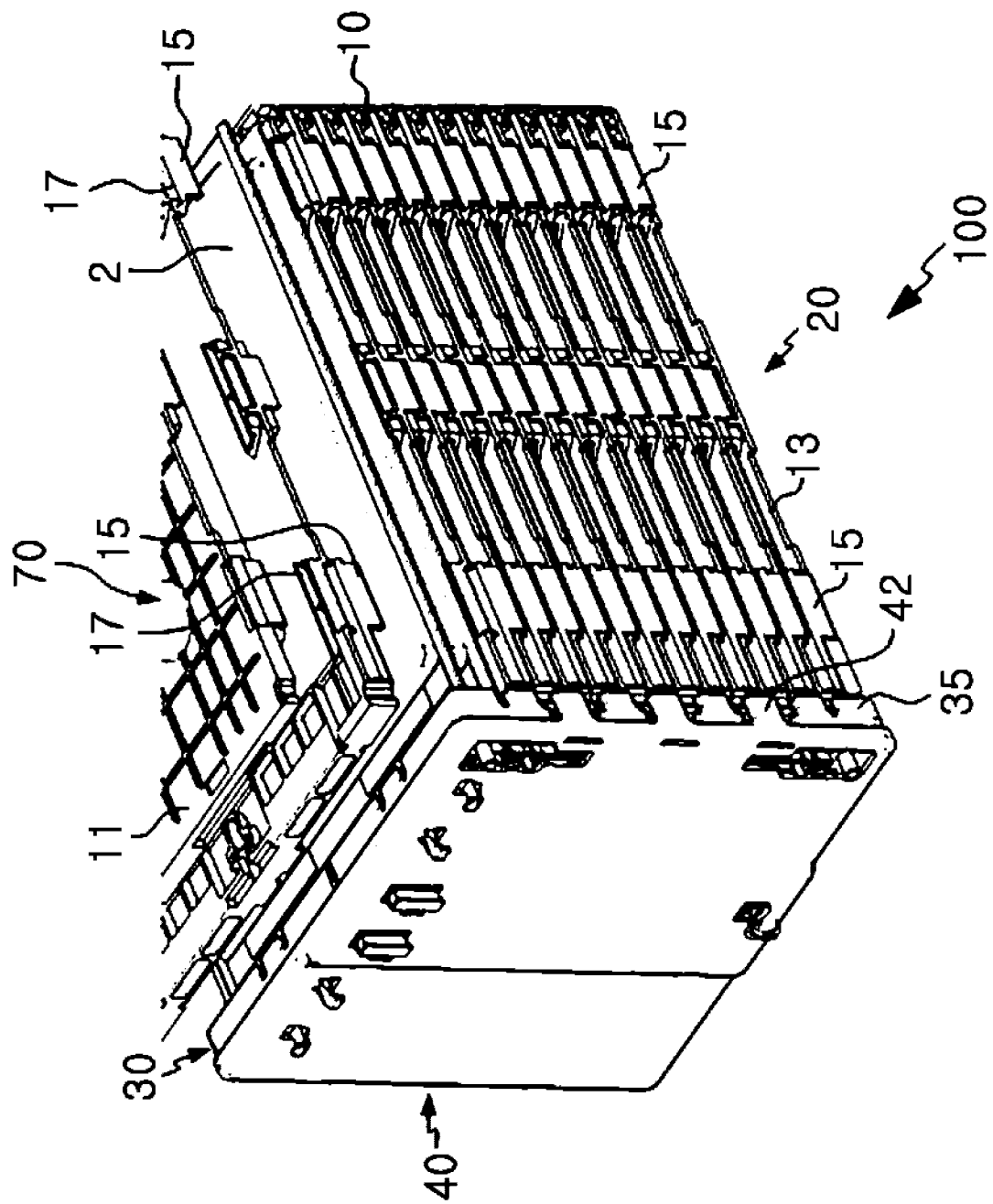
FIG. 4 is a partially extracted view from the exploded perspective view of FIG. 1.
Figure 5:
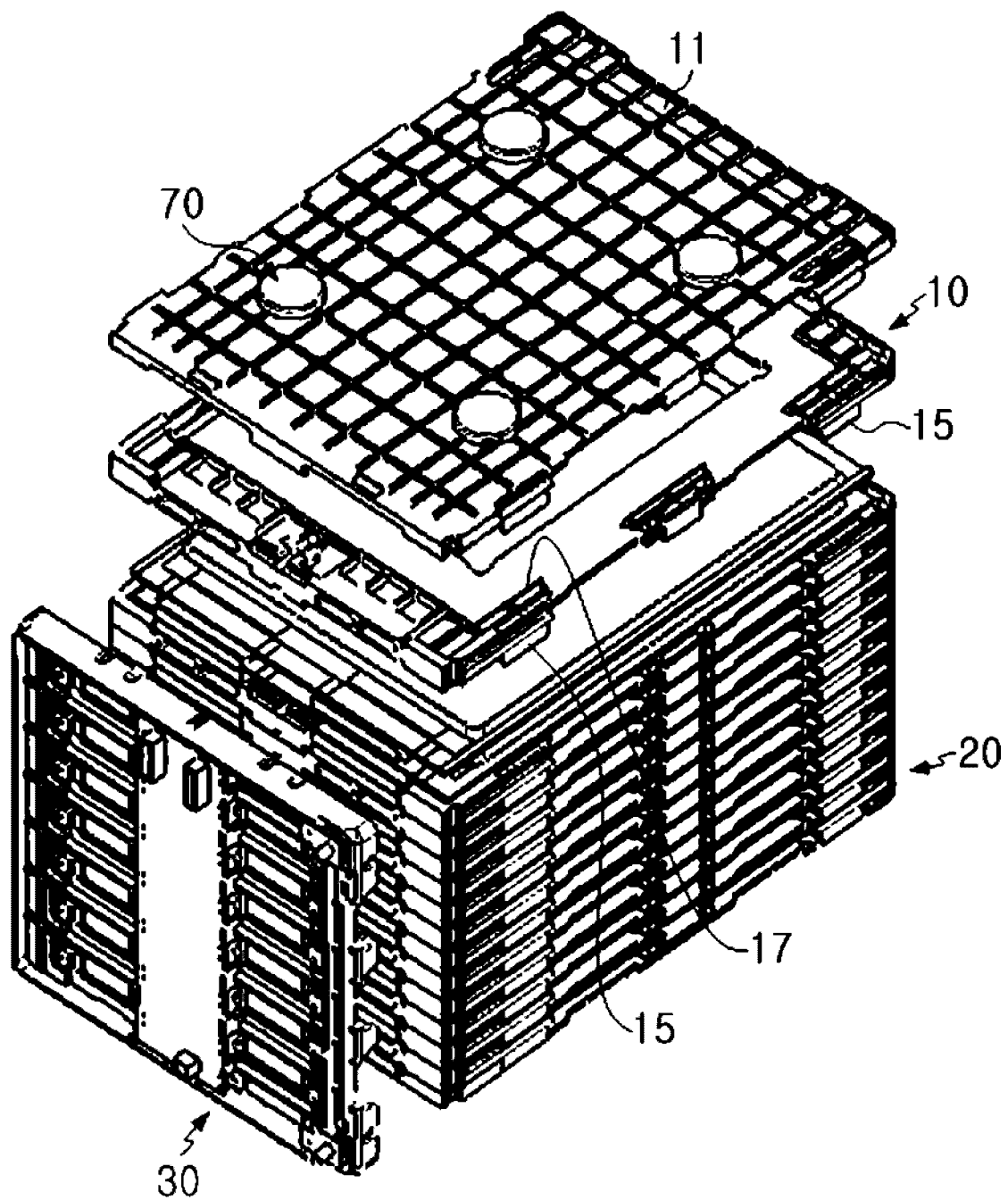
FIG. 5 is another exploded perspective view of FIG. 1.

FIG. 1 is a perspective view of a secondary battery module according to an exemplary embodiment in a front assembled state, FIG. 2 is a rear perspective view of FIG. 1, FIG. 3 is an exploded perspective view of FIG. 1, FIG. 4 is a partially extracted view from the exploded perspective view of FIG. 1, and FIG. 5 is another exploded perspective view of FIG. 1.

Referring to FIGS. 1 to 5, a compact secondary battery module 100 according to an exemplary embodiment includes a cartridge assembly 20 stacked with a plurality of cartridges 10 receiving respective cells 2, a sensing housing 30 coupled with a side surface of the cartridge assembly 20 by, for example, one-touch, snap-fit, or hook manner, and a sensing cover 40 configured to protect a plurality of bus bars 32 and a BMS circuit board 34 installed in the sensing housing 30.

The cartridge assembly 20 is a stack of a plurality of cartridges 10 injection-molded with plastic, and having a receiving portion for receiving the cells 2. Each cartridge 10 may be preferably coupled by snap-fitting or hooking. Each cartridge 10 may include a plurality of cartridge hooks 15 and cartridge slots 17 on a side surface for coupling with the adjacent cartridge 10. For example, the cartridge hook 15 may be protruded on a lower portion of an edge of each cartridge 10, and the cartridge slot 17, to which the cartridge hook 15 of the adjacent cartridge 10 is to be inserted and coupled, may be prepared on an upper portion of the edge of the cartridge 10.

The cartridge assembly 20 may include an upper cover 11 and a lower cover 13 which are coupled with the cartridges 10 on both ends by hooking, for example. The upper cover 11 and the lower cover 13 may be respectively injection-molded so as to have substantially the same shape as an individual cartridge 10 of the cartridge assembly 20. The upper cover 11 may be provided with the cartridge hook 15 for coupling with the cartridge slot 17 of the adjacent cartridge 10, and the lower cover 13 may be provided with the cartridge slot 17 to be inserted and coupled with the cartridge hook 15 of the adjacent cartridge 10. The upper cover 11 and the lower cover 13 may have a function of protecting the cells 2 received in the cartridges 10 on both ends and have functions and structure of closing and surrounding an external shape of the secondary battery module 100, which can be understood by a person skilled in the art.

In an example where the cartridge 10, the upper cover 11, and the lower cover 13 are each stacked to form the cartridge assembly 20, fastening grooves 19 are prepared on each of the side surfaces for coupling with a housing hook 35 of the sensing housing 30, which will be described below. That is, when the fastening grooves 19 of each cartridge 10 are previously formed with the injection molding and the cartridges 10 are stacked to form the cartridge assembly 20, such fastening grooves 19 can be selectively coupled with the housing hook 35 of the sensing housing 30. The fastening grooves 19 of each cartridge 10 may be prepared on a peripheral region of an edge where electrode leads 12, 14 of the cells 2 are positioned.

Figure 6:
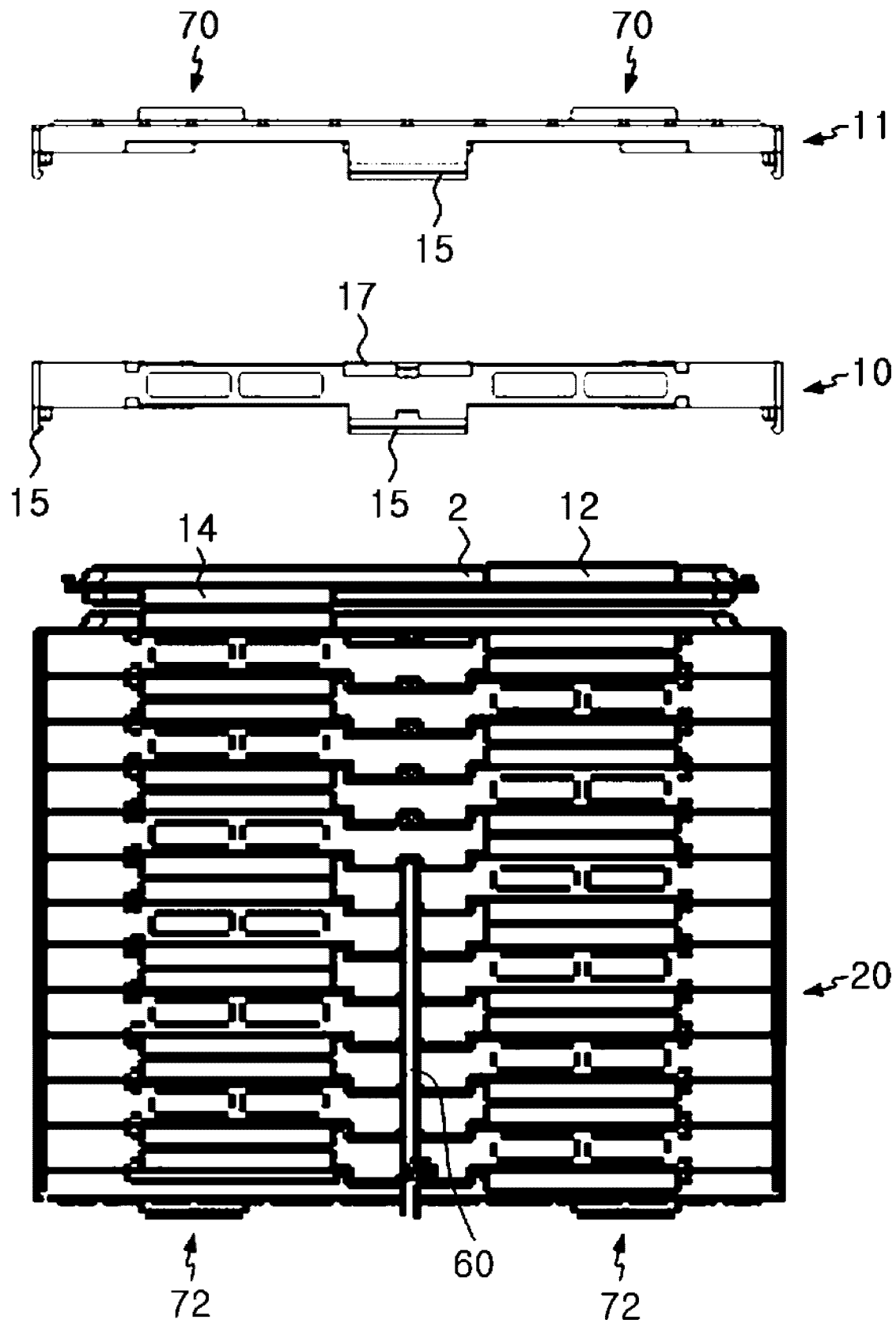
FIG. 6 is an exploded perspective view of a cartridge assembly seen from a side according to an exemplary embodiment.
Figure 7:
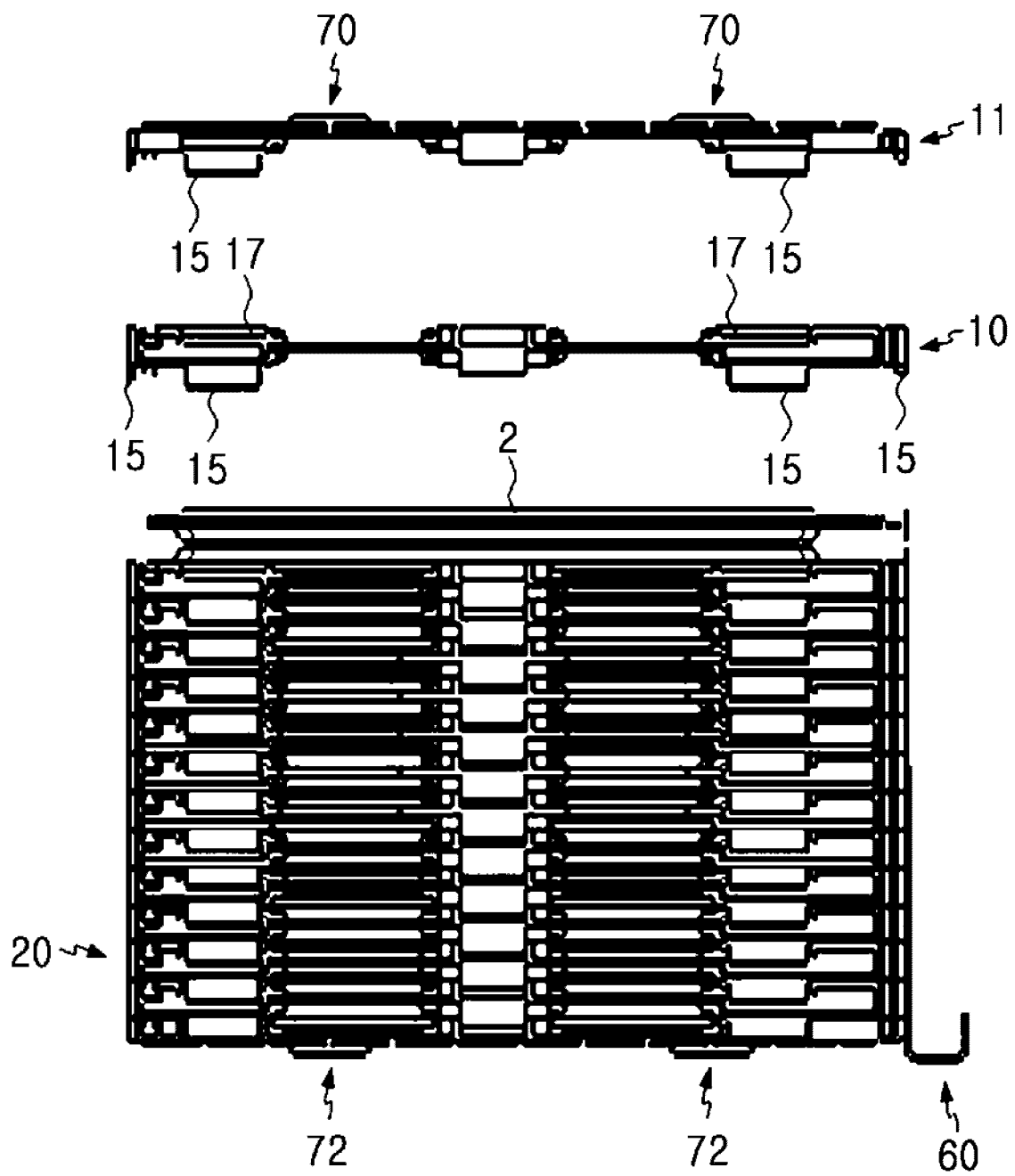
FIG. 7 is an exploded perspective view illustrating the cartridge assembly of FIG. 5 seen from a rear side.

FIG. 6 is an exploded perspective view of a cartridge assembly seen from a side according to an exemplary embodiment, and FIG. 7 is an exploded perspective view of the cartridge assembly of FIG. 5 seen from a rear side.

Referring to FIGS. 6 and 7, the module 100 including the cartridge assembly 20 described above may include an upper fixation member 70 formed on an upper surface of the upper cover 11, and a lower fixation member formed on a lower surface of the lower cover 13. Meanwhile, according to another modified embodiment, in addition to, or instead of the upper and lower fixation members, the fixation members may be formed on a side surface of the module 100 (i.e., surface opposite the sensor housing 30 in the exemplary embodiment), which can be understood by a person skilled in the art.

Each cartridge 10 may be provided with the cartridge hooks 15 and two cartridge slots 17 at two locations of both sides in a long side direction, and provided with one cartridge hook 15 and one cartridge slot 17 approximately at a center of a short side surface opposite the short side surface where the sensing housing 30 is positioned.

Further, the upper cover 11 may be provided with the cartridge hooks 15 at a location corresponding to the cartridge assembly 20, and the lower cover 13 may be provided with the cartridge slots 17 at a location corresponding to the cartridge assembly 20.

Figure 8:
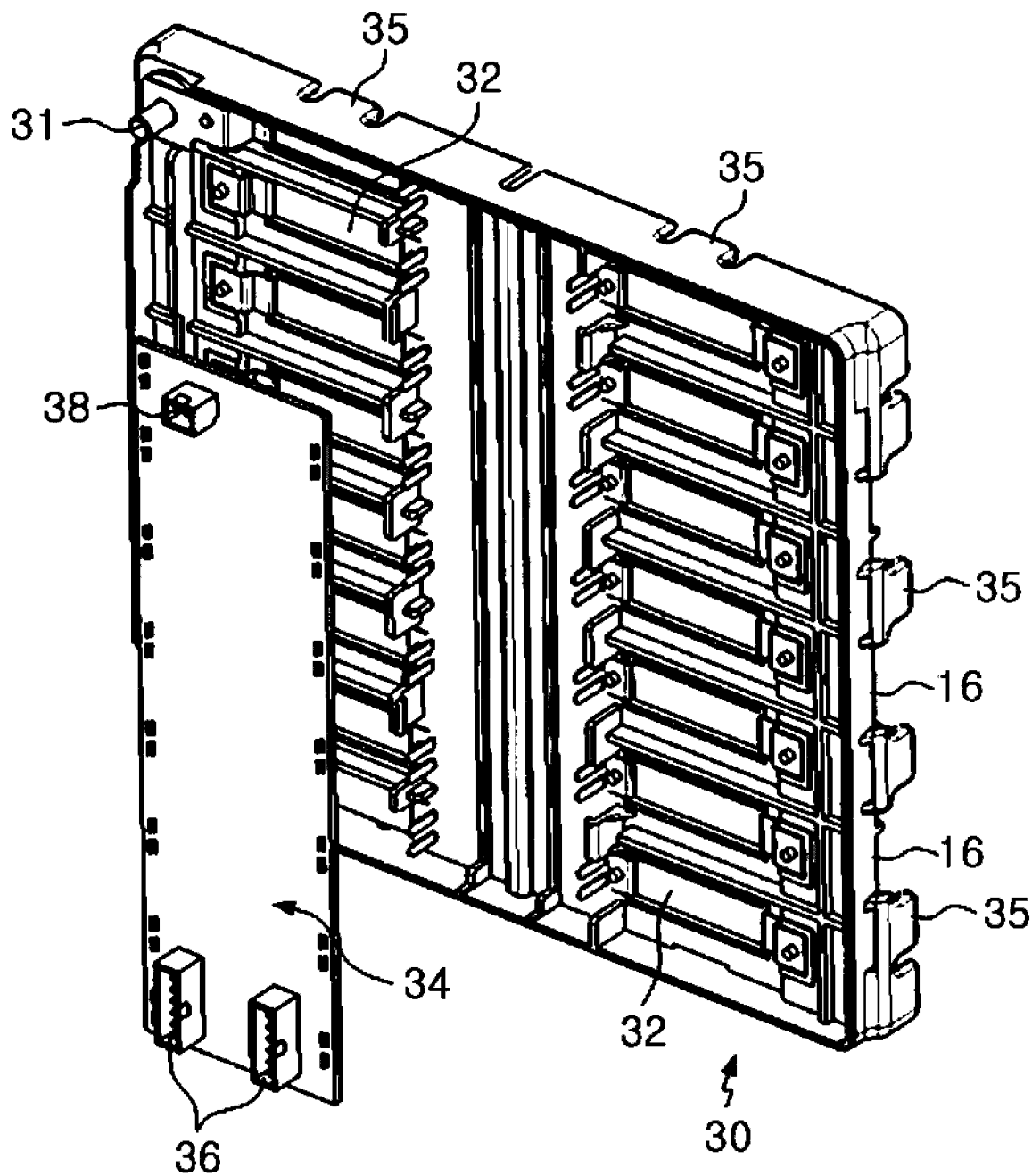
FIG. 8 is an exploded perspective view illustrating the sensing housing of FIG. 3.
Figure 9:
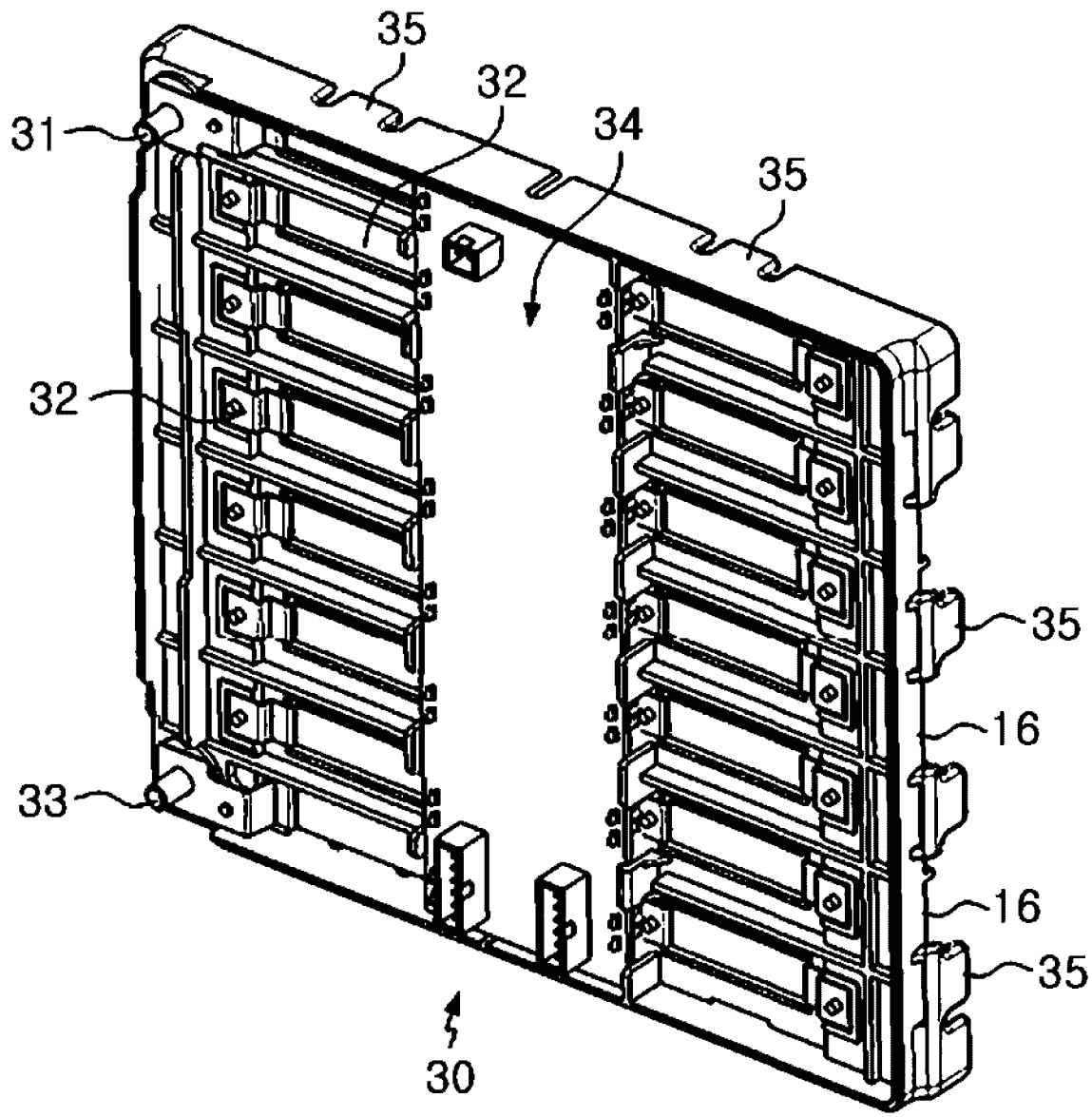
FIG. 9 is a perspective view of FIG. 8 in an assembled state.

FIG. 8 is an exploded perspective view of the sensing housing illustrated in FIG. 3, and FIG. 9 is a perspective view of FIG. 8 in an assembled state.

Referring to FIGS. 8 and 9, the sensing housing 30 may be injection-molded in a roughly rectangular shape with insulating plastics for example, and selectively coupled with, or separated from the cartridge assembly 20. For the above, on an edge of the sensing housing 30, a plurality of housing hooks 35 may be prepared integrally with a housing body. As described above, each housing hook 35 may be snap-coupled with the corresponding fastening groove 19 of the cartridge assembly 20. Further, the sensing housing 30 may include a plurality of bus bars 32 disposed correspondingly to positions of the leads 12, 14 of each cell. Each bus bar 32 may be preferably formed of copper, for example. Approximately at a center portion of the sensing housing 30, there may be installed a master form of the BMS circuit board 34 having functions of collecting voltage and/or temperature data of each cell 2 sensed by the corresponding bus bar 32, balancing the corresponding cell 2 through the collected data, and delivering the data to another controller (not illustrated) of the module. The BMS circuit board 34 may be electrically connected to one end of each bus bar 32. Further, when coupled with a plurality of modules 100, the BMS circuit board 34 may include a pair of data communication ports 36 to trans-receive data between respective BMS circuit boards 34, a temperature data port 38 to be described in detail below, which is connected to an end of a cable 60 connected to a temperature sensor (not illustrated) to receive a signal of the temperature sensor that measures internal temperature of the secondary battery module 100, and a positive electrode terminal 31 and a negative electrode terminal 33 of the completed secondary battery module 100.

The first lead 12 and the second lead 14 of each of the adjacent cells 2 may respectively be extended by a certain distance from a side of each cell 2 and bent, and may have a certain width. The first lead 12 of each cell 2 may be bent by 90 degrees in a downward direction in the drawing, and the second lead 14 may be bent by 90 degrees in an upward direction in the drawing. Further, the first lead 12 and the second lead 14 of the adjacent cells 2, which have opposite polarities, may form a certain pattern of a lead welding portion. For example, the first lead 12 of one cell 2 among the adjacent cells may be extended from the bent portion by about a half length of a thickness of the cartridge 10, and the second lead 14 of another cell 2 may be extended by about the other half length of the thickness of the cartridge 10. Therefore, the first lead 12 and the second lead 14 may be positioned on a same plane in the lead welding portion, with ends thereof being substantially contacted with, or spaced apart from each other by a certain gap, while being faced each other. According to an alternative embodiment, the first lead 12 and the second lead 14 may be disposed to overlap each other. As described above, when the sensing housing 30 is coupled with the cartridge assembly 20 in a state that the first lead 12 and the second lead 14 are forming a certain pattern of the lead welding portion, each of the corresponding bus bars 32 may be faced with the lead welding portion, and the first lead 12 and the second lead 14 of the lead welding portion may be welded to the corresponding bus bars 32 by using a laser welder, for example.

The sensing cover 40 may be provided to protect the BMS circuit board 34 and the bus bar 32 while the sensing housing 30 is coupled with the cartridge assembly 20. The sensing cover 40 may be preferably injection-molded with an insulating plastic material. Further, the sensing cover 40 may include a plurality of cover hooks 42 prepared on an edge thereof. Each of the cover hooks 42 may be selectively inserted into the housing slots 16 respectively prepared at corresponding locations of the sensing housing 30.

The upper fixation member 70 is formed on the upper cover 11 to fix the module 100 in position, by directly being fixed on a pack cover 130 or a bracket 120 which will be described below, or being coupled with the lower cover 13 of another module positioned thereon when the modules 100 are stacked vertically.

The upper fixation member 70 may be configured as a boss structure that has a shape of a cylindrical column, and such boss may be installed on the upper cover 11 by force-fitting, or molded integrally with the upper cover 11 when the upper cover 11 is manufactured. Further, the boss may have a column structure that has a polygonal shape such as oval, triangle, square, rectangle, pentagon, hexagon, and octagon, or a rhombus form in cross section, which can be understood by a person skilled in the art.

The lower fixation member 72 formed on the lower cover 13 may be coupled with the upper fixation member 70 of the upper cover 11 of another module positioned on a bottom surface of (or under) a pack case 110, to fix the module 100 in position.

The lower fixation member 72 may have an insertion groove having a circular cross section and a predetermined depth to receive the boss of the upper fixation member 70 of another module 100 inserted therein, or a protrusion (in the same structure and shape as the boss described above) formed on a bottom of the pack case 110, which will be described below. Such insertion groove may be formed in an oval, polygon, and rhombus shape, as described above.

Further, although the embodiment illustrates and describes that the upper fixation member 70 may have a boss structure, and that the lower fixation member 72 may have an insertion groove structure, conversely, the upper fixation member 70 may have an insertion groove structure, and the lower fixation member 72 may have a boss structure, as can be easily understood by a person skilled in the art. In the above case, it is of course possible that structure of another corresponding module and/or configuration of the pack case 110, the bracket 120, and the pack cover 130 may become different.

Figure 10:
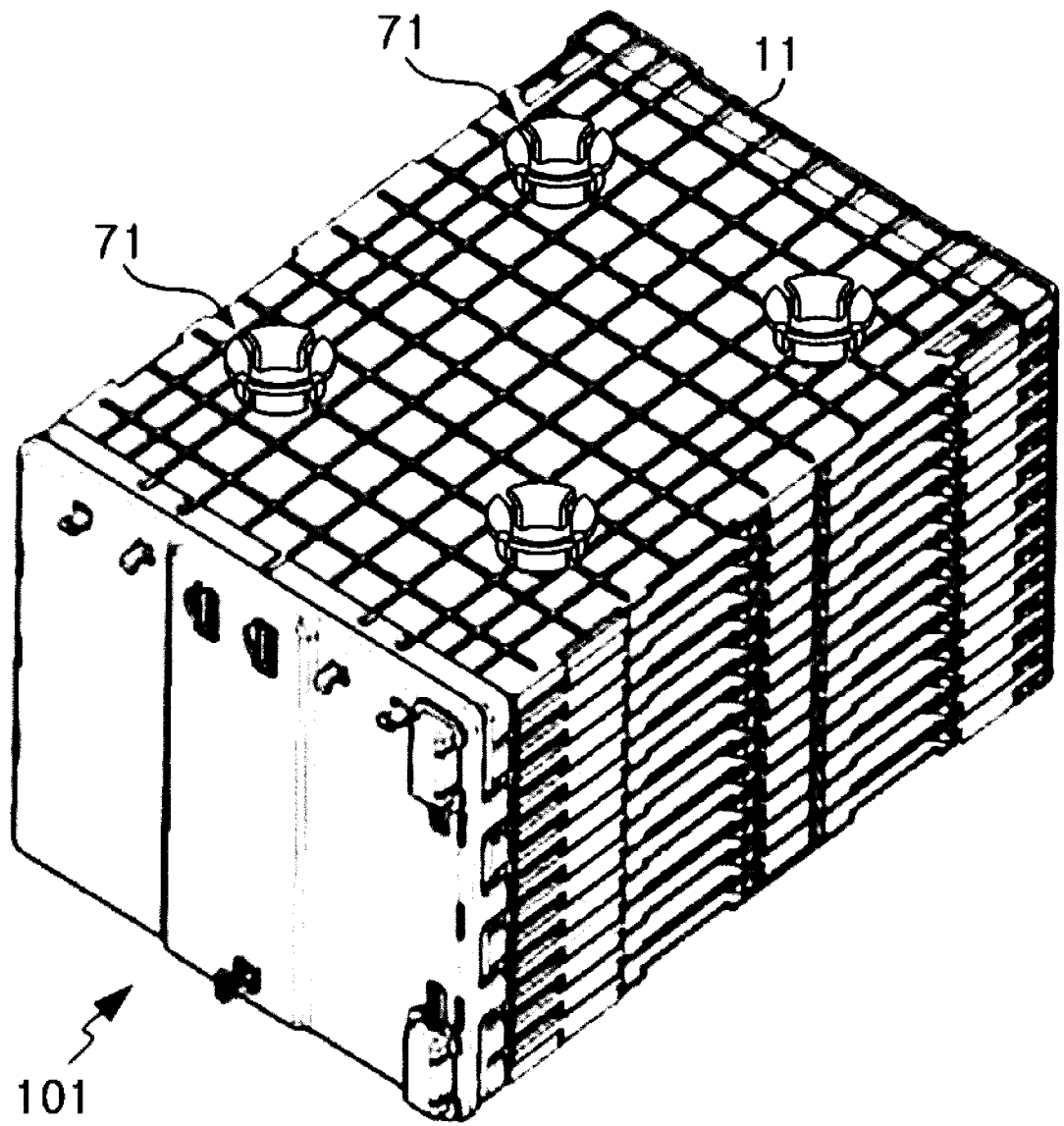
FIG. 10 is a perspective view briefly illustrating a compact secondary battery module according to another exemplary embodiment.

FIG. 10 is a perspective view briefly illustrating a compact secondary battery module according to another exemplary embodiment. Constituent elements with the same reference numerals in FIGS. 1 to 9 are the same members having same functions.

Referring to FIG. 10, the module 101 according to an exemplary embodiment includes the upper fixation member including four fixing hooks 71 on an upper surface of the upper cover 11 of the cartridge assembly 20. Each of the fixing hooks 71 may have a structure in which a plurality of discontinuous elastic pieces 73, of which a cross section is roughly circular, are extended outwardly. The shape of such fixing hooks 71 may be also modified into an oval, polygon, or rhombus shape. Further, the corresponding insertion groove of the lower cover 13 may be slightly modified to a structure that can receive the fixing hook 71 inserted and fixed therein, as can be understood by a person skilled in the art. Differently from the example of the boss described above which allows a rework for disassembling or reassembling of the pack, each of the fixing hooks 71 according to an embodiment may be useful when the rework is unnecessary, as the pack is almost not necessarily assembled or reassembled. Further, the fixing hooks 71 may ensure stronger fixation force than the boss structure described above. In order to prevent the fixation member from absorbing impact due to vibration, and so on occurred in the cartridge assembly 20, which can otherwise damage the fixation member, a bushing member (not illustrated) prepared with rubber or plastic may be provided in the fixation member including the boss structure and the fixing hooks 71 described above. However, the material of the bushing member (not illustrated) may not be limited to rubber or plastic.

Figure 11:
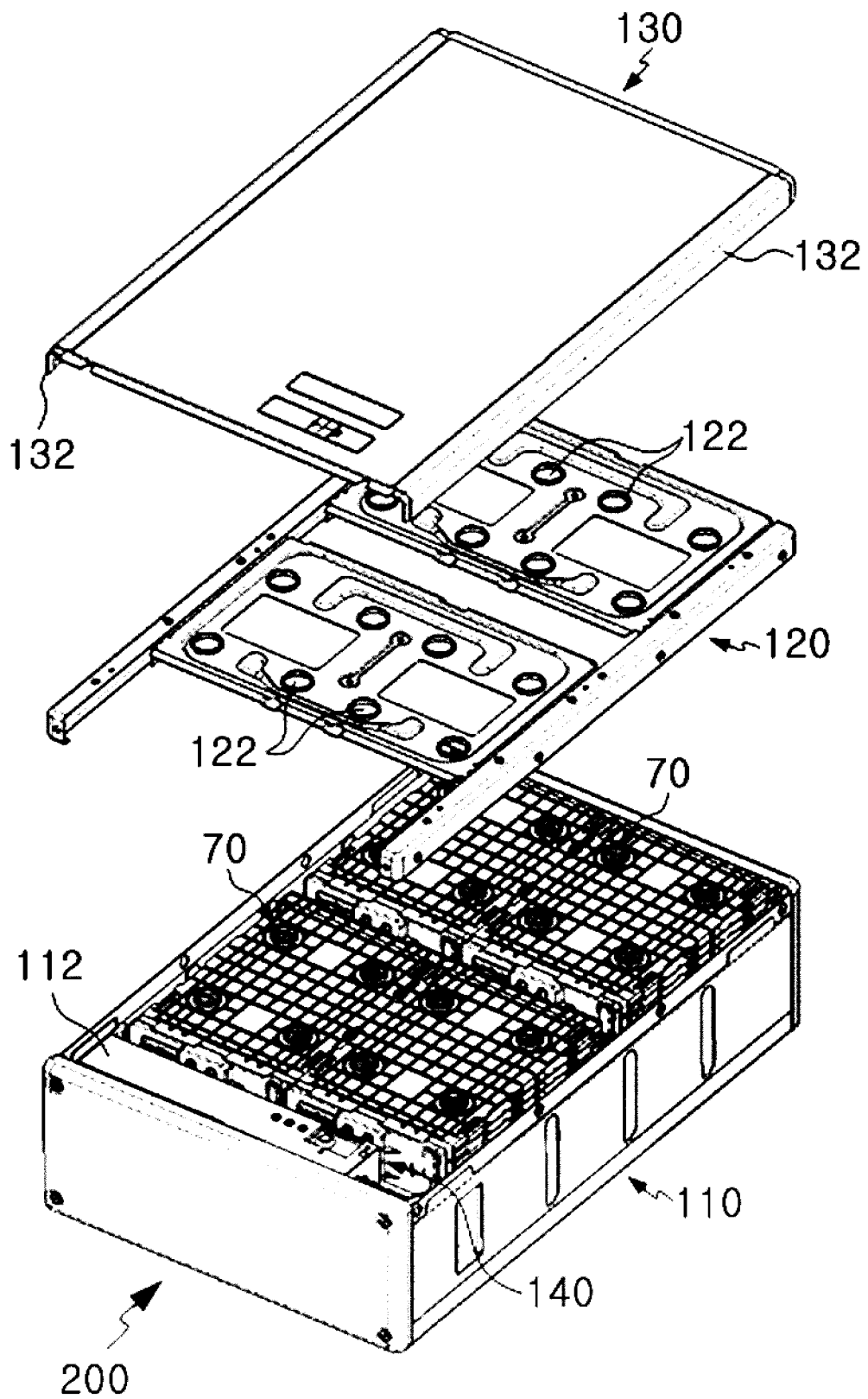
FIG. 11 is an exploded perspective view illustrating a secondary battery pack according to an exemplary embodiment.
Figure 12:
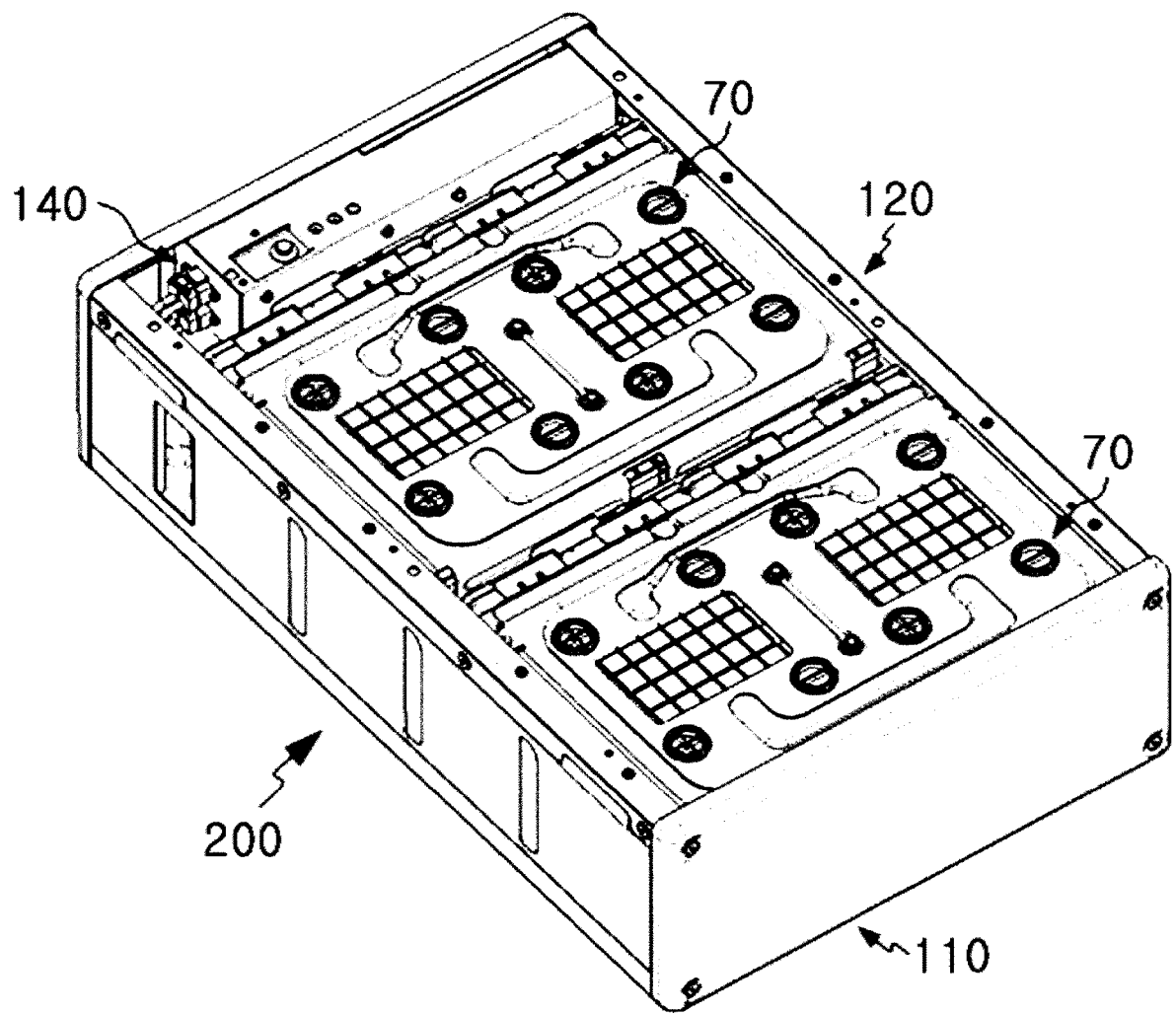
FIG. 12 is an extracted perspective view illustrating four compact secondary battery modules being received in the pack case of FIG. 11, and fixed in position with two brackets.

FIG. 11 is an exploded perspective view of a secondary battery pack according to a preferable exemplary embodiment, and FIG. 12 is an extracted perspective view illustrating four compact secondary battery modules being received in the pack case of FIG. 11 and fixed in position with two brackets.

Referring to FIGS. 11 and 12, the secondary battery pack 200 includes the pack case 110 having a receiving space 112 to receive four modules 100 connected in series or in parallel mechanically/electrically, modules 100 having the upper fixation members 70 according to the exemplary embodiments described above respectively provided on the upper cover 11, a bracket 120 having a fixing part 122 that is coupled with the fixation member 70 to fix the modules in position and that may be disposed in the receiving space 112, and a pack cover 130 that may cover the pack case 110.

The pack case 110 may be a cabinet-like structure in a rectangle shape, which may be formed substantially by connecting plates with each other, or formed integrally, and in which one side (bottom) is closed and the other side is open to be sealed by the pack cover 130. The pack case 110 and the pack cover 130 may be preferably formed of electrical insulating material. Further, the modules received in the receiving space 112 of the pack case 110 may be disposed in two-row and two-column (2×2) form.

The bracket 120 may be provided to fix relative positions of a pair of adjacent modules 100 and their absolute positions in the receiving space 112 of the pack case 110, in which a fixing part 122 in a form of a hole may be provided correspondingly to a location of the upper fixation member 70, to receive the boss of the upper fixation member 70 provided on the upper cover 11 of each module 100 to be inserted therein. The bracket 120 may be preferably formed of a material having excellent rigidity, being light-weight, and having excellent electrical insulation property. An edge of the bracket 120 may be laid on an upper surface of the pack case 110, or fit into a sidewall of the receiving space 112. A reference numeral 140 of FIGS. 10 and 11 represents a control unit received together with the modules 100 in the receiving space 112.

As described above, the pack cover 130 may be provided to cover an upper surface of the pack case 110, and may have coupling bars 132 on both sides of the pack case 110 for coupling with both sidewalls of the pack case 110 while the modules 100 are in received state. Further, a bracket fixing part (not illustrated) that may be coupled with the bracket 120 described above may preferably be prepared on a lower surface of the pack cover 130. The bracket fixing part 122 may prevent movement of the bracket 120, thus preventing sway or movement of the module 100 fixed with the bracket 120.

Of course, although not illustrated, protrusions (not illustrated) may be prepared on the bottom surface of the pack case 110 to be inserted into the insertion groove of the lower case 13 of each module 100, thereby fixing each module 100 in position, as described above.

Figure 13:
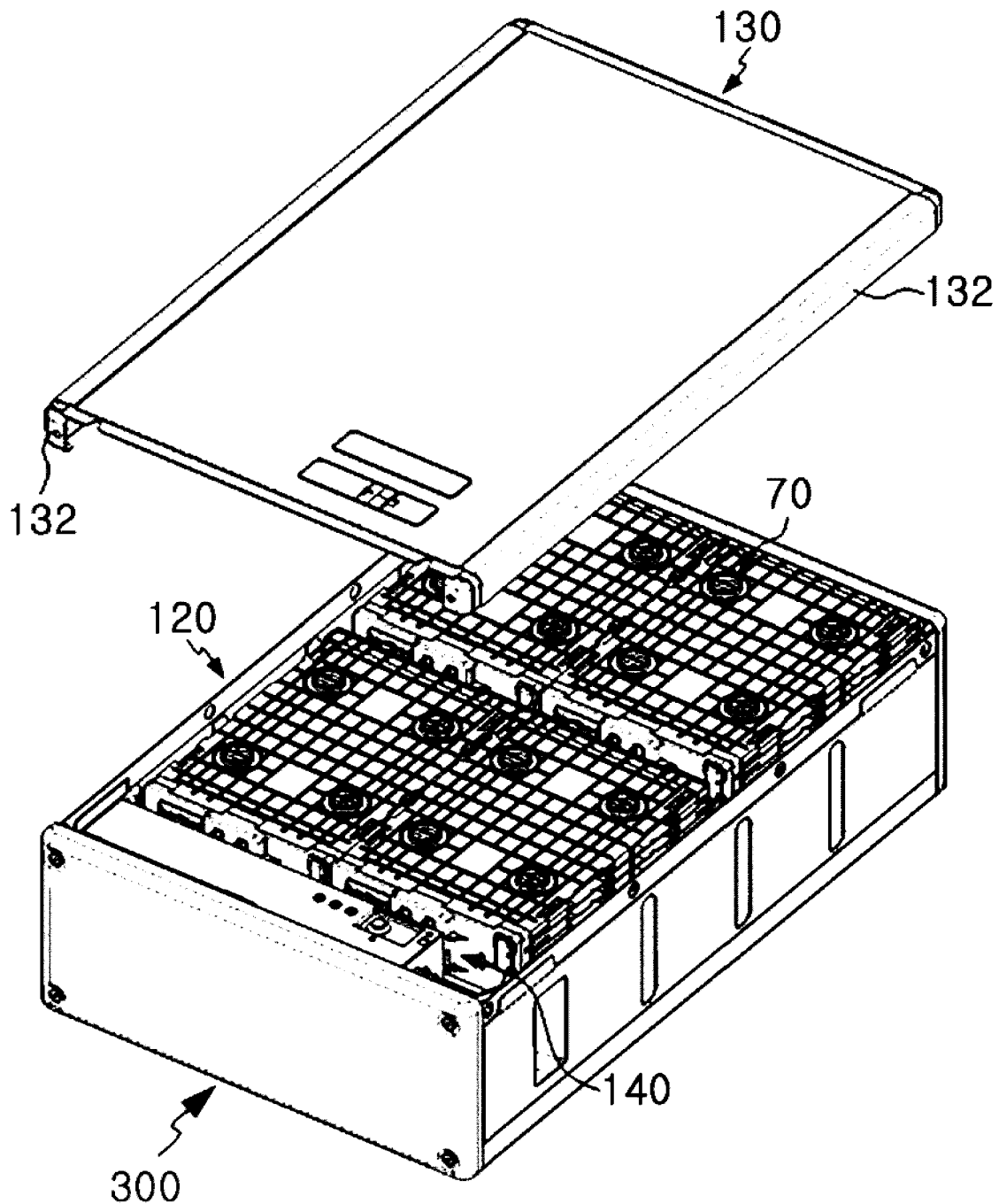
FIG. 13 is an exploded perspective view illustrating a secondary battery pack according to another exemplary embodiment.

FIG. 13 is an exploded perspective view illustrating a secondary battery pack according to another exemplary embodiment.

Referring to FIG. 13, in the secondary battery pack 200 according to an exemplary embodiment, the bracket 120 of the secondary battery pack 300 of FIGS. 11 and 12 is removed and a coupling part of the bracket 120 may be configured on the lower surface of the pack cover 130. That is, the bosses of the fixation member 70 of each module 100 received in the pack case 110 may be fixed with the fixing part (not illustrated) in a hole form provided on the lower surface of the pack cover 130 when the pack cover 130 is coupled with the pack case 110, thus fixing the modules 100 in respective positions. Further, according to the exemplary embodiments, the brackets 120 described above may be formed integrally with the pack cover 130.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. Accordingly, the embodiments disclosed in the present disclosure are provided to explain, not to limit a technical art of the present disclosure, and thus, the scope of the present disclosure is not limited. The scope of the present disclosure should be construed by following claims, and every technical art within a same scope of the following claims should be construed to be included in a scope of a right of the present disclosure.

INDUSTRIAL APPLICABILITY

The present disclosure relates to a compact secondary battery module and a secondary battery pack using the same, and is applicable in the industry related with the secondary battery module and the secondary battery pack.

What is claimed is:

1. A secondary battery module, comprising:
  a cartridge assembly comprising at least two or more cartridges that are stacked and combined, an upper cover, and a lower cover, wherein each cartridge of the at least two or more cartridges, the upper cover and the lower cover are rectangular and include two long sides and two short sides; and
  a plurality of secondary battery cells, each secondary battery cell being provided in a respective one of the at least two or more cartridges, wherein each cartridge of the at least two or more cartridges includes only one secondary battery cell,
  wherein the upper cover includes a plurality of hooks and a plurality of upper fixation members,
  wherein the lower cover includes a plurality of slots and a plurality of lower fixation members,
  wherein each cartridge of the at least two or more cartridges includes:
    a plurality of hooks, wherein two of the plurality of hooks are provided at a longitudinal center of a respective long side; and
    a plurality of slots, wherein two of the plurality of slots are provided at the longitudinal center of a respective long side,
    wherein each of the plurality of hooks of a first cartridge of the at least two or more cartridges engages a respective one of the plurality of slots of an adjacent second cartridge of the at least two or more cartridges,
    wherein each of the plurality of upper fixation members is a boss including a sidewall protruding outwardly from the upper cover and away from the cartridge assembly,
    wherein each of the plurality of lower fixation members is a groove extending into the lower cover towards the cartridge assembly and having a predetermined depth and shape corresponding to the sidewall of the boss to fix the secondary battery module to another secondary battery module, and
    wherein the sidewall of the boss is divided into fixing hooks spaced from each other in a circumferential direction.

2. The secondary battery module of claim 1, wherein each of the plurality of upper fixation members has a column structure having a circle, oval, polygon, or rhombus shape in cross section, and
  wherein each of the lower fixation members has a shape corresponding to the respective upper fixation member.

3. A secondary battery pack comprising the secondary battery module according to claim 1.

4. The secondary battery module of claim 3, wherein the secondary battery pack comprises a home photovoltaic solar panel energy storage system.

5. The secondary battery pack of claim 1, wherein each upper fixation member, each lower fixation member, and each cartridge of the at least two or more cartridges is provided without threads.

6. The secondary battery pack of claim 1, wherein each of the plurality of cartridges is provided without a boss.

7. The secondary battery pack of claim 1, wherein the fixing hooks of the sidewall of the boss curve radially outwardly as the fixing hooks extend upwardly from the upper cover.

8. A secondary battery pack in which a plurality of secondary battery modules are connected in series or in parallel mechanically/electrically, the secondary battery pack comprising:
  a pack case having a receiving space;
  each of the secondary battery modules including: a cartridge assembly comprising at least two or more cartridges for housing a plurality of secondary battery cells that are stacked and combined, an upper cover, and a lower cover, wherein each cartridge of the at least two or more cartridges, the upper cover and the lower cover are rectangular and include two long sides and two short sides, wherein the secondary battery modules are disposed in the receiving space; and
  a pack cover coupled with a respective cartridge of the at least two or more cartridges to fix the secondary battery modules in position,
  wherein the upper cover includes a plurality of hooks and a plurality of upper fixation members,
  wherein the lower cover includes a plurality of slots and a plurality of lower fixation members,
  wherein each cartridge of the at least two or more cartridges includes:
    a plurality of hooks, wherein two of the plurality of hooks are provided at a longitudinal center of a respective long side; and
    a plurality of slots, wherein two of the plurality of slots are provided at the longitudinal center of a respective long side,
    wherein each of the plurality of hooks of a first cartridge of the at least two or more cartridges engages a respective one of the plurality of slots of an adjacent second cartridge of the at least two or more cartridges,
  wherein the pack cover covers the pack case,
  wherein each of the plurality of upper fixation members is a boss including a sidewall integrally molded with the upper cover and protruding outwardly from the upper cover and away from the respective cartridge assembly,
  wherein each of the plurality of lower fixation members is a hole having a shape and size corresponding to the sidewall of the respective upper fixation member,
  wherein the sidewall of the boss is divided into fixing hooks spaced from each other in a circumferential direction.

9. The secondary battery pack of claim 8, wherein each of the plurality of upper fixation members has a column structure having a circle, oval, polygon or rhombus shape in cross section.

10. The secondary battery pack of claim 8, wherein the secondary battery pack comprises a home photovoltaic solar panel energy storage system.

11. The secondary battery pack of claim 8, wherein each upper fixation member, each lower fixation member, and each cartridge of the at least two or more cartridges is provided without threads.

12. The secondary battery pack of claim 8, wherein each of the plurality of cartridges is provided without a boss.

13. The secondary battery pack of claim 8, wherein the fixing hooks of the sidewall of the boss curve radially outwardly as the fixing hooks extend upwardly from the upper cover.

14. A secondary battery pack in which a plurality of secondary battery modules are connected in series or in parallel mechanically/electrically, the secondary battery pack comprising:

a pack case having a receiving space;

wherein each of the plurality of secondary battery modules includes: a cartridge assembly comprising at least two or more cartridges for housing a plurality of secondary battery cells that are stacked and combined, an upper cover, and a lower cover, wherein each cartridge of the at least two or more cartridges, the upper cover and the lower cover are rectangular and include two long sides and two short sides, wherein the secondary battery modules are disposed in the receiving space;

a bracket coupled with a respective cartridge of the at least two or more cartridges to fix the secondary battery modules in position, wherein the bracket is disposed in the receiving space; and a pack cover provided to cover the pack case, wherein the upper cover includes a plurality of hooks and a plurality of upper fixation members, wherein the lower cover includes a plurality of slots and a plurality of lower fixation members, wherein each cartridge of the at least two or more cartridges includes:

a plurality of hooks, wherein two of the plurality of hooks are provided at a longitudinal center of a respective long side; and a plurality of slots, wherein two of the plurality of slots are provided at the longitudinal center of a respective long side, wherein each of the plurality of hooks of a first cartridge of the at least two or more cartridges engages a respective one of the plurality of slots of an adjacent second cartridge of the at least two or more cartridges, wherein each the plurality of upper fixation members is a boss including a sidewall integrally molded with the upper cover and protruding outwardly from the upper cover and away from the respective cartridge assembly, wherein each of the plurality of lower fixation members is a hole having a shape and size corresponding to the sidewall of the respective upper fixation member, and wherein the sidewall of the boss is divided into fixing hooks spaced from each other in a circumferential direction.

15. The secondary battery pack of claim 14, wherein the secondary battery pack comprises a home photovoltaic solar panel energy storage system.

16. The secondary battery pack of claim 14, wherein each upper fixation member, each lower fixation member, and each cartridge of the at least two or more cartridges is provided without threads.

17. The secondary battery pack of claim 14, wherein each of the plurality of cartridges is provided without a boss.

18. The secondary battery pack of claim 14, wherein the fixing hooks of the sidewall of the boss curve radially outwardly as the fixing hooks extend upwardly from the upper cover.

* * * * *